(12) United States Patent  (10) Patent No.: US 6,743,076 B2
Adachi et al.                 (45) Date of Patent:    Jun. 1, 2004

(54) DICING MACHINE

(75) Inventors: Tadashi Adachi, Mitaka (JP);
Masayuki Azuma, Mitaka (JP);
Takayuki Kaneko, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 100 days.

(21) Appl. No.: 10/143,827

(22) Filed: May 14, 2002

(65) Prior Publication Data
US 2002/0168921 A1 Nov. 14, 2002

(30) Foreign Application Priority Data
May 14, 2001 (JP) ........................................ 2001-143489

(51) Int. Cl.[7] .................. B24B 49/00; B24B 51/00; B24B 55/02; B28D 1/04
(52) U.S. Cl. ...................... 451/6; 125/13.01; 125/13.03; 451/8; 451/450; 451/452; 451/455
(58) Field of Search ........................ 83/399; 125/13.01, 125/13.03; 451/6, 8, 9, 10, 449, 451, 452, 455, 456, 457, 450

(56) References Cited

U.S. PATENT DOCUMENTS 4,022,182 A * 5/1977 Lenkevich ............... 125/13.01
4,484,417 A * 11/1984 Klingerman ............... 451/53
6,010,396 A * 1/2000 Ohmiya ....................... 451/450

FOREIGN PATENT DOCUMENTS

| JP | 405206266 A | * | 8/1993 |
| JP | 10-116802 | | 5/1998 |
| JP | 11-144557 | | 5/1999 |
| JP | 11-251263 | | 9/1999 |
| JP | 11-340169 | | 12/1999 |
| JP | 02000025032 A | * | 1/2000 |

* cited by examiner

Primary Examiner—Timothy V. Eley
(74) Attorney, Agent, or Firm—Nixon Peabody LLP; David S. Safran

(57) ABSTRACT

The flange cover covering the blade is divided into two. The second cover is turnably connected to the first cover through a shaft parallel with the spindle of the blade, and the second cover is opened and closed in connection with vertical movement of the spindle. When the spindle is moved upward for replacing the blade, the second cover is automatically turned to the opening position, and L-shaped coolant jetting nozzles are moved away from positions below the blade to positions beside the blade. Thus, the blade can be easily replaced, and an automatic blade replacing system can be applied.

4 Claims, 6 Drawing Sheets

PRIOR ART

DICING MACHINE

BACKGROUND OF THE INVENTION

1. Field of the Invention

The present invention relates to a dicing machine which dices a work or semiconductor wafer.

2. Description of the Related Art

The dicing machine is an apparatus in which a rotary blade rotates at a high speed and dices a work or a semiconductor wafer. Parts of the blade except a cutting part are covered with a flange cover. The flange cover is provided with a pair of nozzles, through which cutting solution is jetted to both sides of the blade cutting the work.

The flange cover is divided into two to facilitate replacement of the blade. The conventional flange cover is divided into two at a boundary plane perpendicular to a rotary shaft of the blade. In the two covers, a first cover which is positioned to the motor side is fixed to a stationary member such as the motor, and a second cover is connected to the first cover with bolts. Each of the first and second covers is provided with one of the nozzles. If the flange cover is an integrated unit, the nozzles obstruct the replacement of the blade. Hence, when the blade is replaced, the second cover is removed from the first cover so as to remove the nozzle.

The flange cover is also provided with a breakage detector, which optically detects breakage of the blade without contacting the blade. The breakage detector comprises a light-projecting unit including a light and its optical system, and a light-receiving unit including a light-receiving device and its optical system. The light-projecting unit and the light-receiving unit are arranged to face each other across the blade. The light-projecting unit is attached to the first cover, and the light-receiving unit is attached to the second cover. Since the light-receiving unit also obstructs the replacement of the blade, the second cover is removed so as to remove the light-receiving unit.

In this conventional dicing machine, the second cover must be removed from the first cover whenever the blade is replaced, therefore much time is needed for the replacement of the blade.

In order to solve the above-described problem, Japanese Patent Application Publication No. 11-251263 discloses a dicing machine that has a partially-turnable flange cover 36 shown in FIG. 6. The flange cover 36 is divided into the first cover 38 and the second cover 40. The second cover 40 can turn within a plane perpendicular to a rotary shaft 18A of the rotary blade 18 with respect to the first cover 38. The second cover 40 is provided with a pair of coolant jetting nozzles 20 and a breakage detector 50, which includes the light-projecting unit and the light-receiving unit as an integrated unit. When the rotary blade 18 is replaced, the operator has only to turn the second cover 40 so as to withdraw the second cover 40, the coolant jetting nozzles 20 and the breakage detector 50 from the rotary blade 18, without removing the second cover 40.

However, the operator still has to manually turn the second cover 40, and it is a problem to introduce an automatic system for replacing the blade disclosed in Japanese Patent Application Publication No. 11-340169 and so forth.

In the conventional dicing machine, the light-projecting unit and the light-receiving unit of the blade breakage detecting device are arranged on the flange cover near the blade. Hence, there is another problem that the light-projecting face and the light-receiving face are soiled with water containing cutting powders produced on the cutting of the work, and the detectability of the breakage detecting device gradually deteriorates.

SUMMARY OF THE INVENTION

The present invention has an object to provide a dicing machine in which the rotary blade can be exchanged easily without needing a lot time, can correspond with the system for exchanging the rotary blades automatically, and further can automatically check a detecting ability of the blade breakage detector.

In order to attain the above described object, the present invention is directed to a dicing machine which processes a work with a rotary blade, the dicing machine comprising: a spindle on which the rotary blade is attached and rotated, the spindle moving in a vertical direction in processing of the work; a turnable cover which covers the rotary blade in processing of the work; an axis on which the turnable cover is turnably arranged, the axis being parallel with the spindle; and a nozzle through which liquid is applied toward the rotary blade in processing of the work, the nozzle being arranged on the turnable cover, wherein the turnable cover is turned in connection with vertical movement of the spindle so that the nozzle is moved away from the rotary blade.

According to the present invention, since the turnable cover turns to follow the vertical movement of the spindle, the nozzles can automatically retreat from the rotary blade.

Preferably, when the spindle moves upward, the turnable cover is turned upward to open; and when the spindle moves downward, the turnable cover is turned downward to close. According to the present invention, the nozzles can automatically retreat from the rotary blade when the spindle moves up, and can automatically return to the original positions when the spindle moves down.

Preferably, the dicing machine further comprises: a breakage detector which detects breakage of the rotary blade, the breakage detector being arranged on the turnable cover, wherein the breakage detector is moved away from the rotary blade when the turnable cover is turned upward to open. According to the present invention, the breakage detector can automatically retreat from the rotary blade when the spindle moves up, and can automatically return to the original position when the spindle moves down.

Preferably, the breakage detector comprises an optical detector including a light-projecting unit and a light-receiving part, and ascertains whether a received luminous energy in the light-receiving part is within a predetermined range when the breakage detector is moved away from the rotary blade. According to the present invention, the breakage detector can automatically determines whether the detectability thereof deteriorates by the contamination on the light-projecting face and the light-receiving face of the light-projecting unit and the light-receiving part.

According to the present invention, the cutting blade can be replaced easily without needing a lot time, and the automatic blade replacing system can be applied. Moreover, the detectability can be checked automatically in the case that the blade breakage detector retreats from the rotary blade.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder a dicing machine of the present invention will be described in detail in accordance with the accompanied drawings.

Figure 1:
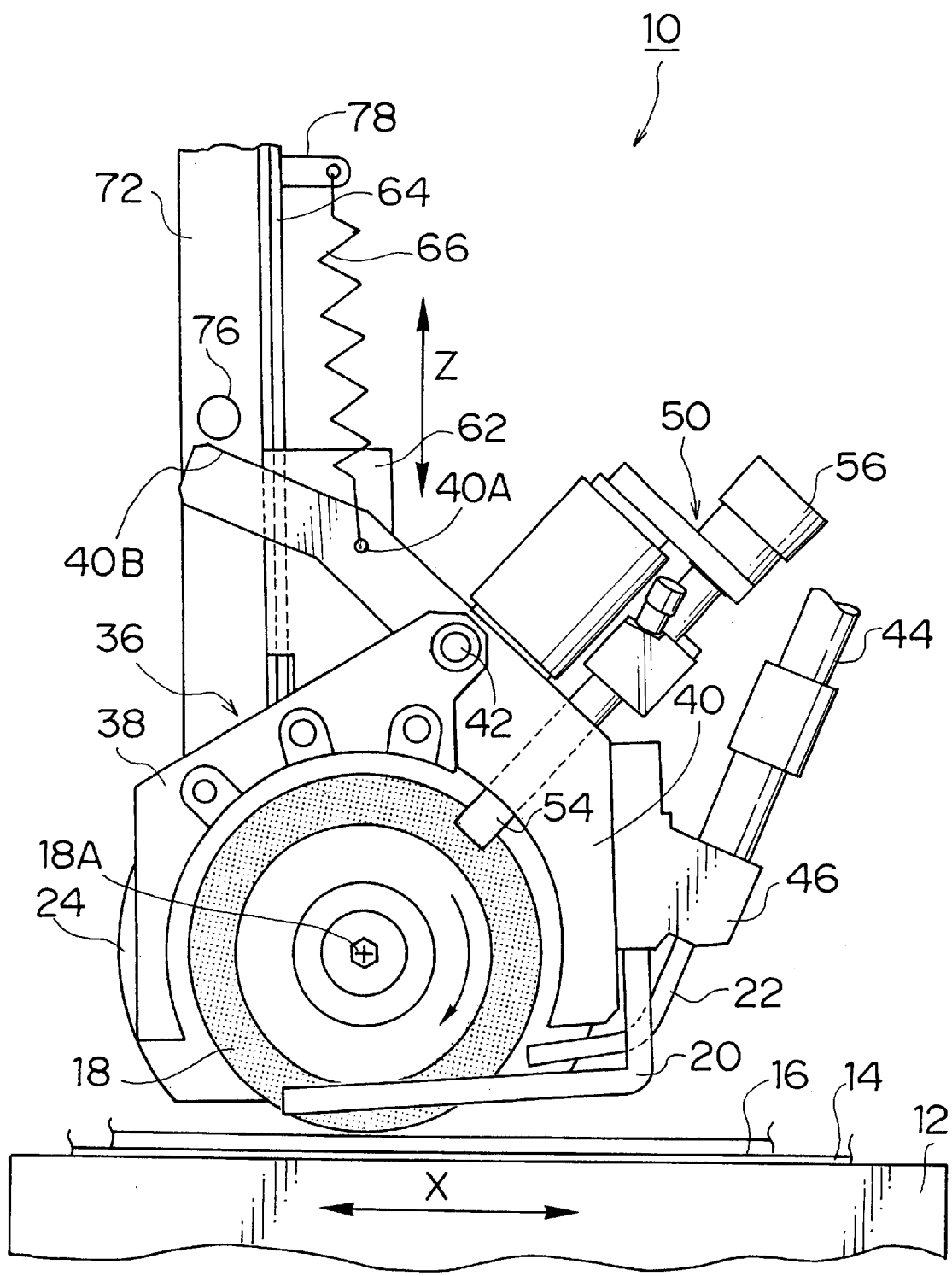
FIG. 1 is a front view of a dicing machine of a present embodiment.
Figure 2:
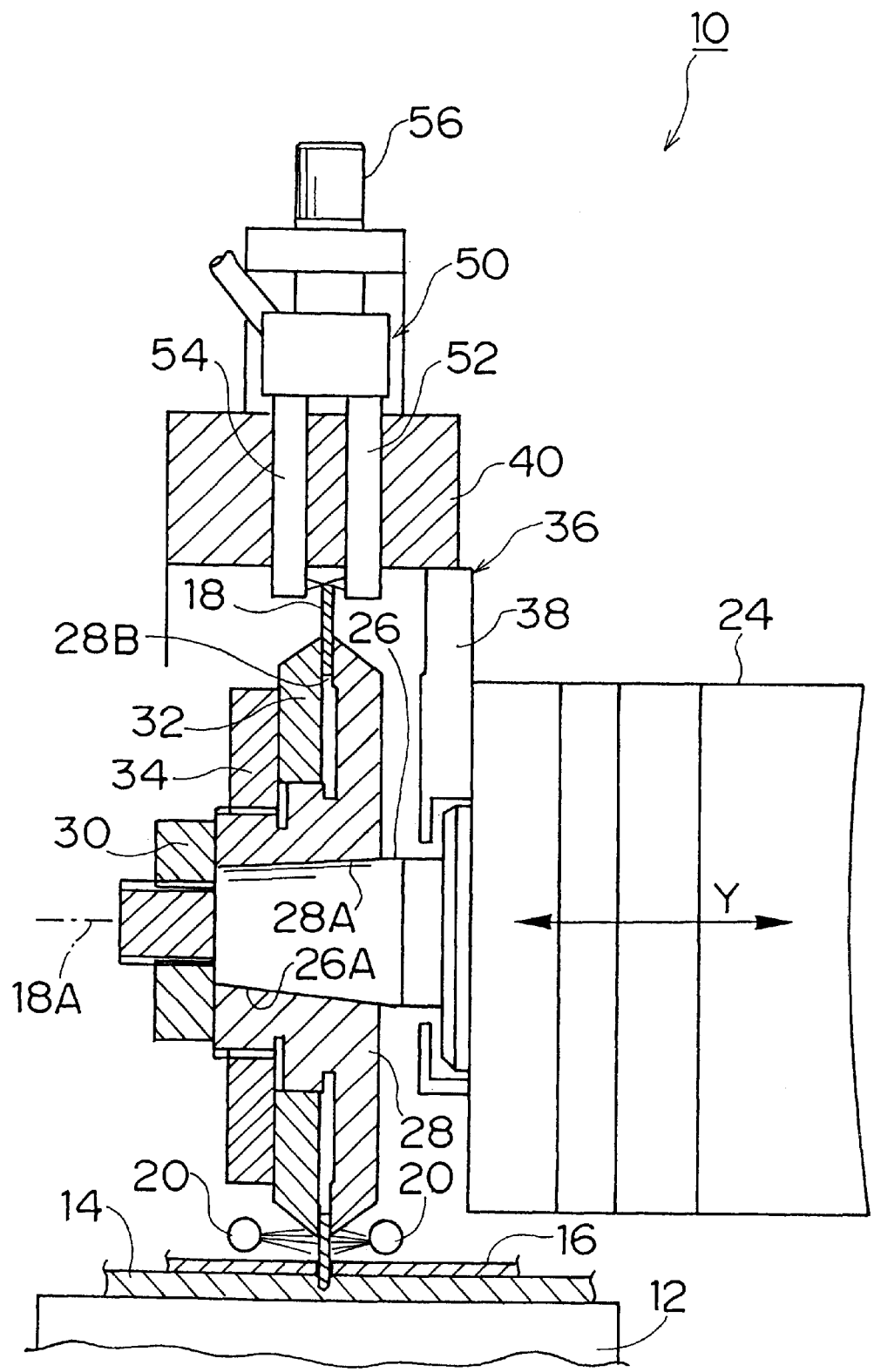
FIG. 2 is a sectional side elevation of the dicing machine of the embodiment.
Figure 3:
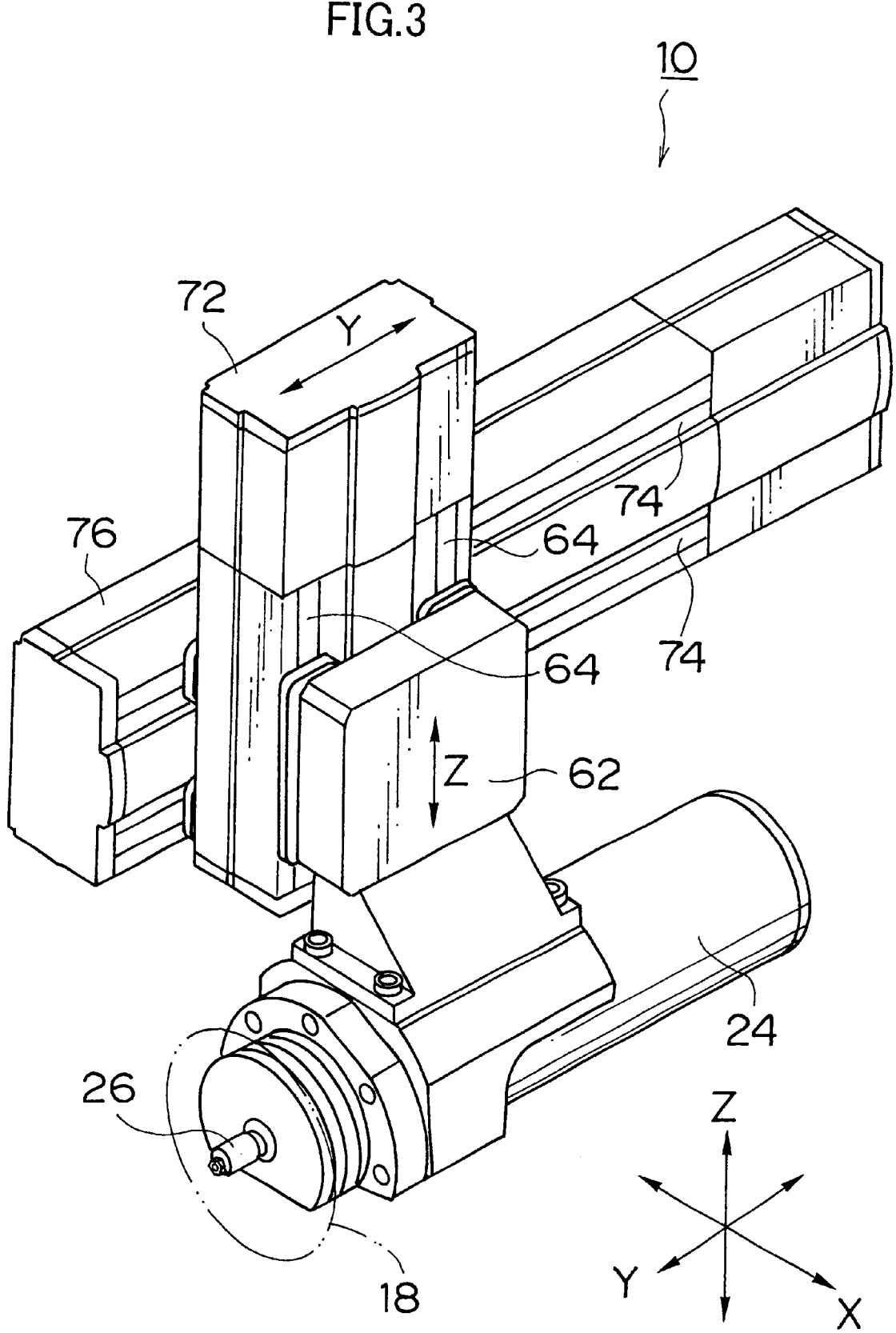
FIG. 3 is a perspective view explaining driving mechanisms in a Y direction and a Z direction of the dicing machine of the embodiment.

FIG. 1 is a front view of a dicing machine 10 according to an embodiment of the present invention, and FIG. 2 is a sectional side view of the dicing machine 10 in FIG. 1. FIG. 3 is a perspective view explaining a driving mechanism of a Y direction (front-to-back direction) and a Z direction (vertical direction) of a spindle on which a rotary blade is mounted.

In FIG. 1, the dicing machine 10 has a cutting table 12 which moves for cutting along the X direction in FIGS. 1 and 3. A work 16 is held by suction on the cutting table 12 through an adhesive sheet 14, and is aligned. Then, the work 16 is diced with a blade 18 rotating at a high speed. In order to maintain manufacturing accuracy of the work 16, coolant and cutting solution are applied from a pair of coolant jetting nozzles 20 and a cutting solution jetting nozzle 22 to both sides of the blade 18 so that the blade 18 is cooled and cleaned while cutting the work 16.

In FIG. 2, a motor (spindle rotating motor) 24 driving the blade 18 has a tapering spindle 26, on which a flange 28 is mounted. An internal circumference tapering face 28A of the flange 28 is fit on a tapering face 26A of the spindle 26. The flange 28 is fixed on the spindle 26 with a flange fixing nut 30 screwed on the spindle 26. An annular hub 32 is fit on an external circumference part of the flange 28, and the blade 18 is fixed to the external circumference part of the hub 32 and in contact with a supporting face 28B of the flange 28. The hub 32 is fixed on the flange 28 with a hub fixing nut 34 screwed on the flange 28. Thus, the blade 18 is supported and fixed between the hub 32 and the supporting face 28B of the flange 28.

As shown in FIG. 3, the motor 24 driving the blade 18 is suspended from a Z table 62. The Z table 62 is guided along Z guides 64, which is arranged on a Y table 72, and is driven along the Z direction by a ball screw and a stepping motor (not shown). The Y table 72 is guided along Y guides 74, which are arranged on a Y base 76, and is driven along the Y direction by a ball screw and a stepping motor (not shown). In this construction, the rotary blade 18 attached on the end of the spindle 26 is moved along the Z direction for cutting and along the Y direction for indexing.

Parts of the blade 18 except a cutting part are covered with a flange cover 36 as shown in FIG. 1. The flange cover 36 is divided into a first cover 38 and a second cover 40. The first cover 38 is fixed on a stationary member such as the driving motor 24, and the second cover 40 is turnably connected to the first cover 38 through a shaft 42, which is parallel with a rotary axis 18A of the blade 18.

The cutting solution jetting nozzle 22 for applying the cutting solution to the blade 18 and the pair of L-shaped coolant jetting nozzles 20 for applying the coolant to the blade 18 are attached on the second cover 40 through an attachment block 46. The nozzles 20 and 22 are connected to a supplying tube 44 in the attaching block 46.

A blade breakage detector 50 for detecting breakage of the blade 18 is attached on the second cover 40. The blade breakage detector 50 is a unit comprising a light projecting part 52 including a light-emitting diode and an optical system, and a light receiving part 54 including a light receiving device and an optical system. The light projecting part 52 and the light receiving part 54 are arranged to face each other across the edge of the blade 18 as shown in FIG. 2. The light receiving part 54 measures a luminous energy applied from the light projecting part 52 synchronously with the rotation of the blade 18 so that breakage of the blade 18 is detected. The initial position of the breakage detector 50 is finely adjusted by rotating a knob 56 in a screw mechanism (not shown).

Figure 4:
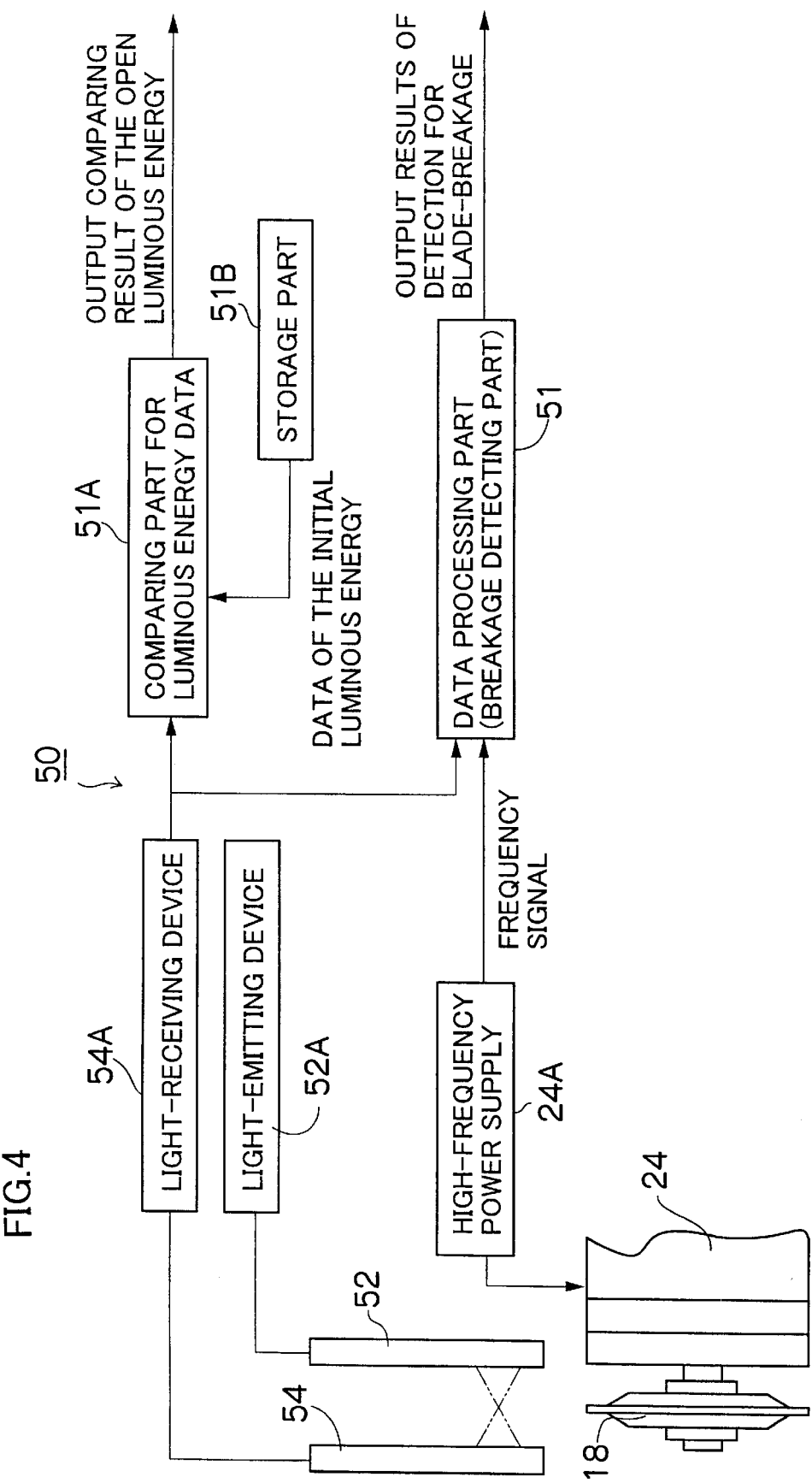
FIG. 4 is a block diagram showing a breakage detector.

FIG. 4 is a block diagram showing an entire construction of the breakage detector 50. The breakage detector 50 comprises the light-projecting unit 52 including the LED as a lighting device 52A described above, the light-receiving part 54 including a light-receiving device 54A to photoelectrically convert the light received from the light-projecting unit 52, and an data processing part 51, which receives data of received luminous energy from the light-receiving unit 54 in synchronism with a frequency signal obtained from a high-frequency power supply 24A to drive the driving motor 24 of the blade 18, and outputs results of detection for blade-breakage by processing the received data. The breakage detector 50 is provided with a luminous energy data comparing part 51A, which receives data of the open received luminous energy that is received by the light-receiving part 54 when the blade 18 does not block off the light projected from the light-projecting unit 52, compares the data of the open received luminous energy with the initial data of the open received luminous energy that has been stored in a storage part 51B, determines whether the data of the open received luminous energy is within a predetermined limits, and outputs compared results of the open luminous energy. In the optical blade breakage detector used generally in the dicing machine, the light-projecting part and the light-receiving part are arranged near the blade, and a light-projecting face and a light-receiving face are soiled with water containing cutting powders produced on the cutting of the work. As the contamination on the light-projecting face and the light-receiving face are gradually accumulated, the luminous energy received by the light-receiving part gradually reduced, and the detectability of the breakage detecting device gradually deteriorates. Hence, in the case that the received luminous energy becomes below a predetermined level, it is necessary that the light-projecting face and the light-receiving face are cleaned. For the reason described above, the luminous energy data comparing part 51A outputs the compared results of the open luminous energy, so that the operator can know how the light-projecting face and the light-receiving face are contaminated.

As shown in FIG. 1, the second cover 40 has a spring attachment hole 40A above the shaft 42, and a tensional spring 66 is provided between the spring attachment hole 40A and a pin 78 provided on the Y base 72. The tensional spring 66 pulls the second cover 40 to turn clockwise around the shaft 42 in FIG. 1, that is, to the direction closing the second cover 40. The Y table 72 is provided with a stopper pin 76 to be in contact with an upper end part 40B of the second cover 40. As the flange cover 36 rises with the Z table 62 rising, the upper end part 40B of the second cover 40 is in contact with the stopper pin 76. When the flange cover 36 further rises, the second cover 40 turns counterclockwise in FIGS. 1 and 5 around the axis 42 and opens as shown in FIG. 5.

Figure 5:
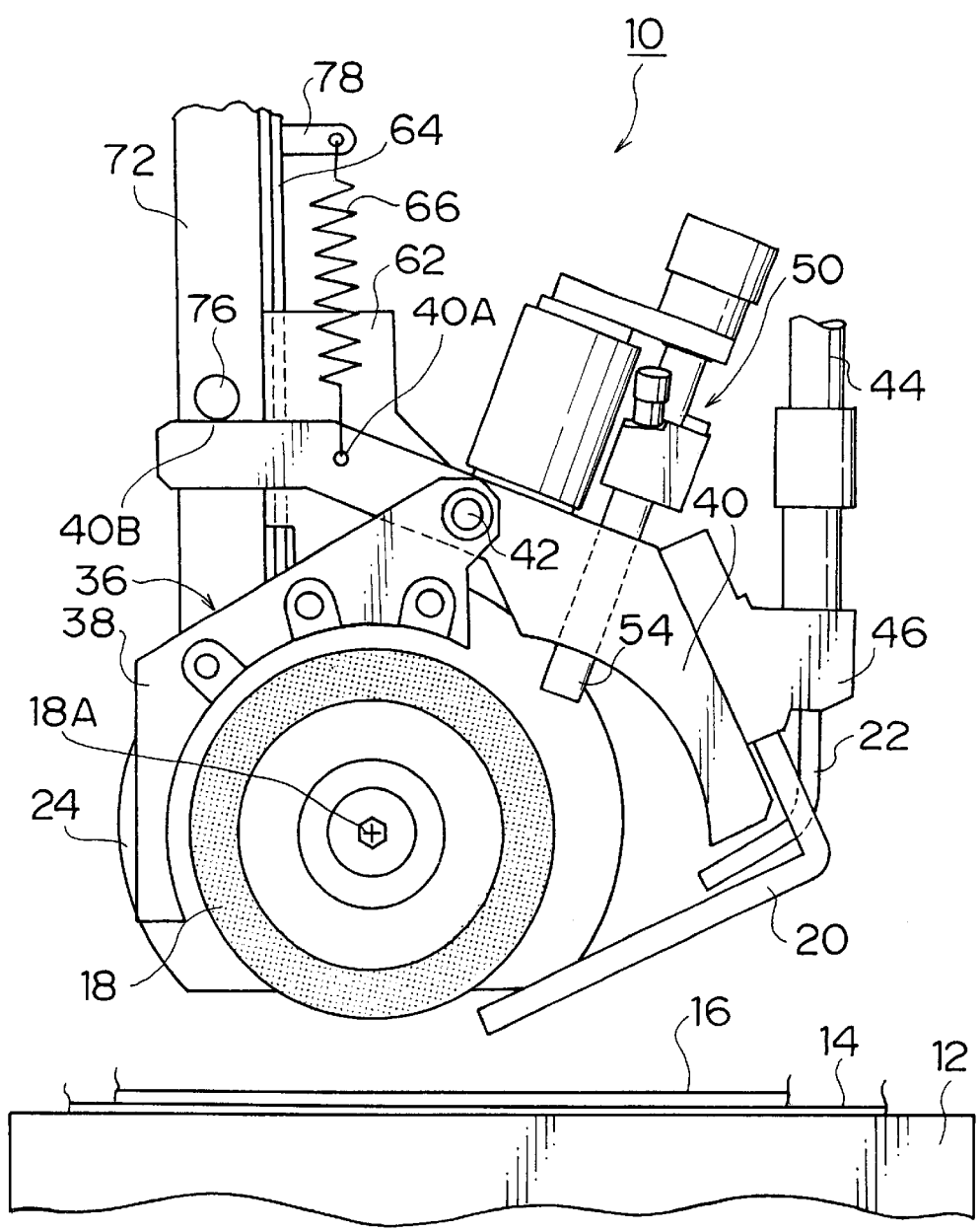
FIG. 5 is a front view showing that a second cover of the dicing machine in FIG. 1 opens.
Figure 6:
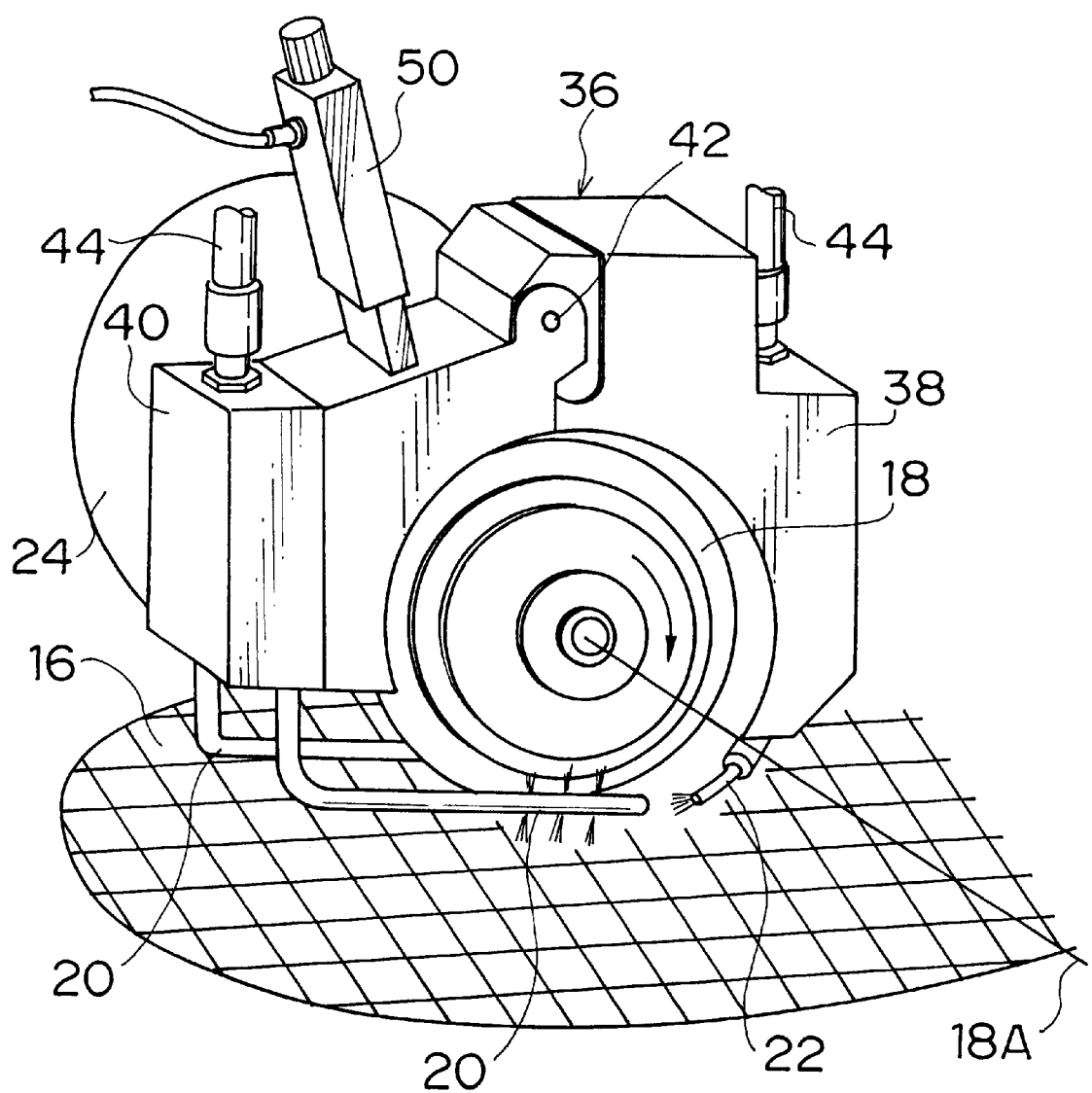
FIG. 6 is a perspective view showing a conventional dicing machine.

Thus, the second cover 40 turns between the closing position in FIG. 1 and the opening position in FIG. 5. As shown in FIG. 5, when the second cover 40 moves to the opening position, the L-shaped coolant jetting nozzles 20 are moved from the lower part to the side of the blade 18, and the light-projecting part 52 and the light-receiving part 54 of the breakage detector 50 are moved from the diagonally upper part to the diagonal side of the blade 18. In this state, the blade 18 can be replaced, and the luminous energy data comparing part 51A automatically measures the open received luminous energy of the light-receiving part 54 and outputs the results, since the blade 18 does not block off the luminous flux between the light-projecting unit 52 and the light-receiving part 54.

When the blade 18 is replaced in the above-described dicing machine 10, as the Z table 62 moves to the blade replacement position at the upper end on the Z direction, the second cover 40 automatically turns to the opening position, the coolant jetting nozzles 20 and the breakage detector 50 retreat, and the open received luminous energy of the breakage detector 50 is measured automatically. Thus, the blade 18 is easily replaced and the contamination of the breakage detector 50 is automatically measured.

In the present embodiment, the second cover 40 is opened and closed along with the spindle 26 moving up and down; however, the second cover 40 is not limited to use the up and down movement of the spindle 26. The second cover 40 may be opened and closed by another driving device such as an air cylinder and a motor.

As described above, according to the dicing machine of the present invention, the cover for the blade is divided into the first cover and the second cover, which is turnably connected to the first cover through the shaft parallel with the spindle of the cutting blade, and the second cover is turned by following the vertical movement of the spindle, so that the second cover automatically opens and the coolant jetting nozzles and the breakage detector retreat when the spindle is positioned at the upper end, and the second cover automatically closes and the coolant jetting nozzles and the breakage detector return to the original positions when the spindle moves down. Thus, in the replacement of the cutting blade, the operator has not to move away and return the coolant jetting nozzles and the breakage detector, so that the cutting blades can be easily exchanged without needing a lot time, and the automatic blade exchanging system can be easily applied. Moreover, the open received luminous energy of the breakage detector is automatically measured when the second cover is opened, so that the detectability of the breakage detector can be automatically determined.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A dicing machine which processes a work with a rotary blade, the dicing machine comprising:

a spindle on which the rotary blade is attached and rotated about an axis, the spindle moving in a vertical direction in processing of the work;

a turnable cover which covers the rotary blade in processing of the work; an axis on which the turnable cover is turnably arranged, the axis of the turntable cover being parallel with the axis of the spindle; and a nozzle through which liquid is applied toward the rotary blade in processing of the work, the nozzle being arranged on the turnable cover, wherein the turnable cover is rotatable about its axis during movement of the spindle in said vertical direction so that the nozzle is moved away from the rotary blade.

2. The dicing machine as defined in claim 1, wherein:

when the spindle moves upward, the turnable cover is turned upward to open; and when the spindle moves downward, the turnable cover is turned downward to close.

3. The dicing machine as defined in claim 2, further comprising:

a breakage detector which detects breakage of the rotary blade, the breakage detector being arranged on the turnable cover, wherein the breakage detector is moved away from the rotary blade when the turnable cover is turned upward to open.

4. The dicing machine as defined in claim 3, wherein the breakage detector comprises an optical detector including a light-projecting unit and a light-receiving part, and ascertains whether a received luminous energy in the light-receiving part is within a predetermined range when the breakage detector is moved away from the rotary blade.

* * * * *